US012322974B1

(12) United States Patent
Ropp

(10) Patent No.: US 12,322,974 B1
(45) Date of Patent: Jun. 3, 2025

(54) METHOD AND APPARATUS FOR DETECTION OF ARBITRARILY LOCATED SINGLE-PHASE OPEN CIRCUITS BY INVERTER-BASED RESOURCES

(71) Applicant: Michael Ropp, Albuquerque, NM (US)

(72) Inventor: Michael Ropp, Albuquerque, NM (US)

(*) Notice: Subject to any disclaimer, the term of this patent is extended or adjusted under 35 U.S.C. 154(b) by 0 days.

(21) Appl. No.: 18/404,310

(22) Filed: Jan. 4, 2024

(51) Int. Cl.
    *H02J 3/38* (2006.01)
    *H02J 3/18* (2006.01)

(52) U.S. Cl.
    CPC ............ *H02J 3/388* (2020.01); *H02J 3/1814* (2013.01); *H02J 3/381* (2013.01)

(58) Field of Classification Search
    CPC .......... H02J 3/381; H02J 3/388; H02J 3/1814
    USPC ........................................................ 307/80
    See application file for complete search history.

(56) References Cited

PUBLICATIONS

S. Gonzalez, E. Abraham, M. Ropp, C. Mouw, D. Schutz, S. Perlenfein, Sandia National Laboratories report SAND2018-8421, "Unintentional Islanding Detection Performance with Mixed DER Types", Aug. 2018.

*Primary Examiner* — Hal Kaplan
(74) *Attorney, Agent, or Firm* — Bradley J. Thorson; DeWitt LLP

(57) ABSTRACT

Methods, apparatuses, and systems for detecting arbitrarily located SPOs between a utility power source and a POI of an IBDER and mitigating the effects of such a SPO. Generally, a SPO will cause certain persistent, predictable variations and differences in voltages between phases. The standard deviations of the per-phase voltages can be calculated for each of a series of successive time intervals, and a difference value between the maximum and minimum standard deviation for each interval can be determined. If the difference value exceeds a threshold value for successive intervals covering a predetermined time period, the presence of a SPO is reliably indicated, and the IBDER can be automatically disconnected to prevent damage to connected equipment. The threshold value, number of intervals, and time period can be selected to provide appropriate sensitivity and selectivity.

15 Claims, 16 Drawing Sheets

METHOD AND APPARATUS FOR DETECTION OF ARBITRARILY LOCATED SINGLE-PHASE OPEN CIRCUITS BY INVERTER-BASED RESOURCES

TECHNICAL FIELD

This application relates to electrical power grids having distributed generation resources, and more specifically to methods and apparatus for managing electrical power grids with distributed inverter-based distributed generation resources.

BACKGROUND

Single phase opens (SPOs) in three-phase electrical power distribution circuits occur when only one phase of the three-phase circuit is isolated from the main utility voltage source at some point along the circuit. SPOs are a relatively common occurrence that can be caused by broken conductors or loose connections, broken or loosened fuses, or single-pole operation of breakers. It is undesirable to operate a three-phase circuit with an SPO for an extended period because operational problems can occur, including overheating of three-phase induction machines due to negative-sequence voltage exposure and irregular voltages on the circuit downstream from the SPO.

Inverter based distributed energy resources (IBDERs) (e.g. photovoltaic (PV) arrays) interconnected with a utility grid are now common. FIG. 1 is a three-line schematic diagram of a distribution circuit that hosts a grid-following IBDER and is experiencing an SPO. In this case, the IBDER may contribute to energization of the open phase downstream (on the IBDER side) from the SPO and to the operational problems that can occur.

IBDERs located in rural areas are often connected to lightly loaded and relatively long distribution circuits via significant lengths of underground cable, and these conditions increase the risk of ferro-resonance involving the IBDER's step-up transformer during a SPO. It is thus important that SPOs be detected, and that appropriate action be taken.

According to IEEE 1547-2018, an IBDER is only required to detect an SPO located at the point of interconnection (POI) between the IBDER and the distribution circuit. An SPO at the POI is usually relatively easy to detect by current-imbalance methods because if there is no load between the POI and the IBDER, the open circuit leaves no current path on the open phase and the phase currents become highly unbalanced. However, for SPOs that are not at the POI but are instead located arbitrarily on the circuit between the POI and the utility source, like the one shown in FIG. 1, or for cases in which the PV plant may be located at a facility such that there is load co-located with the IBDER, the situation becomes more complicated because the IBDER current can flow into loads, transformers, and other components downstream from the SPO, leading to voltage regeneration on the open phase. If the generation-to-load ratio on the open phase downstream from the SPO is near unity, the voltage below the SPO may remain near nominal. Furthermore, there are several "voltage reconstruction mechanisms" that cause there to be at least partial voltage downstream from the SPO even when there are no IBDERs, so that the generation-to-load ratio can be significantly different from unity, but the voltage will still be near nominal. This makes an arbitrarily located SPO between the utility source and the POI of an IBDER difficult to detect.

What is needed are reliable methods for detecting an arbitrarily located SPO between a utility power source and a POI of an IBDER.

SUMMARY OF THE DISCLOSURE

According to embodiments of the invention, methods, apparatus, and systems for detecting arbitrarily located SPOs between a utility power source and a POI of an IBDER and mitigating the effects of such a SPO are provided to address the need in the industry. Generally, a SPO will cause certain persistent, predictable variations and differences in voltages between phases. The standard deviations of the per-phase voltages can be calculated for each of a series of successive time intervals, and a difference value between the maximum and minimum standard deviation for each interval can be determined. The inventor has found that if the difference value exceeds a threshold value for successive intervals covering a predetermined time period, the presence of a SPO is reliably indicated, and the IBDER can be automatically disconnected to prevent damage to connected equipment. The threshold value, number of intervals, and time period can be selected to provide appropriate sensitivity and selectivity.

In an embodiment, a method of detecting and mitigating an arbitrarily-located single-phase open circuit in a three-phase AC power distribution grid hosting an inverter-based distributed energy resource (IBDER) includes: a) measuring an RMS voltage for each one of the three phases over a first sample interval comprising a predetermined time period; b) calculating a standard deviation value of the RMS voltage for each one of the three phases for the first sample interval; c) determining a minimum phase voltage standard deviation and a maximum phase voltage standard deviation from among the three calculated standard deviation values for the first sample interval; d) subtracting the minimum phase voltage standard deviation from the maximum phase voltage standard deviation to produce a difference value for the first sample interval; e) storing the difference value in a buffer; f) iteratively repeating steps a)-e) for successive additional sample intervals until the buffer contains a predetermined number N of difference values covering at least 15 seconds; g) comparing each of the N difference values in the buffer with a predetermined threshold difference value; and h) automatically disconnecting the IBDER from the three-phase power distribution grid if all N difference values exceed the threshold difference value. The method can further include deleting an oldest difference value from the buffer if the IBDER was not disconnected in step h), performing steps a)-e) for an additional successive sample interval, and performing steps g) and h) with the buffer including the difference value for the additional successive sample interval.

In embodiments, the predetermined time period can be one second, and the number N of difference values in the buffer may be at least 15. In preferred embodiments, the predetermined threshold value can be 20 volts. The IBDER may be a photoelectric array.

In further embodiments, a system for detecting and mitigating an arbitrarily-located single-phase open circuit in a three-phase AC power distribution grid hosting an inverter-based distributed energy resource (IBDER) includes at least three voltage sensors, each one of the at least three voltage sensors electrically coupled to measure a phase voltage of a separate one of the phases of the three-phase power distribution grid, and each one of the at least three voltage sensors generating an output signal proportional to the phase voltage of the phase to which it is coupled, and a processor communicatively coupled to receive the output signals of the at least three voltage sensors, and including a buffer. The processor is programmed with an algorithm to a) calculate a standard deviation value of the phase voltage for each one of the three phases based on the received voltage sensor output signals over a first sample interval; b) determine a minimum phase voltage standard deviation and a maximum phase voltage standard deviation from among the three calculated standard deviation values for the first sample interval; c) subtract the minimum phase voltage standard deviation from the maximum phase voltage standard deviation to produce a difference value for the first sample interval; d) store the difference value in the buffer; e) iteratively repeat steps a)-d) for successive additional sample intervals until the buffer contains a predetermined number N of difference values covering at least 15 seconds; f) compare each of the N difference values in the buffer with a predetermined threshold difference value; and g) generate a disconnection signal to disconnect the IBDER from the three-phase power distribution grid if all N difference values exceed the threshold difference value.

In embodiments, the system can further include an automated switch disposed between the IBDER and the three-phase AC power distribution grid, the switch communicatively coupled to the processor and adapted to receive the disconnection signal to interrupt the flow of power from the IBDER to the grid. In embodiments, the automated switch can be a normally open relay.

In further embodiments, the processor can be communicatively coupled to the IBDER, with the IBDER adapted to receive the disconnection signal to interrupt the flow of power from the IBDER to the grid.

In embodiments, the algorithm of the system can further include deleting an oldest difference value from the buffer if a disconnection signal was not generated in step g), performing steps a)-d) for an additional successive sample interval, and performing steps f) and g) with the buffer including the difference value for the additional successive sample interval.

In embodiments, the predetermined time period can be one second, and the number N of difference values in the buffer can be at least 15. In preferred embodiments, the predetermined threshold value is 20 volts. The IBDER can be a photoelectric array.

The summary above is not intended to describe each illustrated embodiment or every implementation of the present disclosure. The figures and the detailed description that follow more particularly exemplify these embodiments.

BRIEF DESCRIPTION OF THE DRAWINGS

Subject matter hereof may be more completely understood in consideration of the following detailed description of various embodiments in connection with the accompanying figures, in which:

FIG. 4b is a simplified process flow diagram of a second portion of the method of FIG. 4a;

DETAILED DESCRIPTION

There are depicted in FIGS. 2-4b embodiments of an apparatus and method according to embodiments of the invention. Grid-following IBDERs are controlled to appear to the grid as power-controlled current sources. On the still connected phases, the utility source regulates the voltage ("voltage-referenced system"), but on the opened phase the voltage is determined by the IBDER output current ("a current-referenced system"), the load impedance, and the various voltage reconstruction mechanisms.

Figure 1:
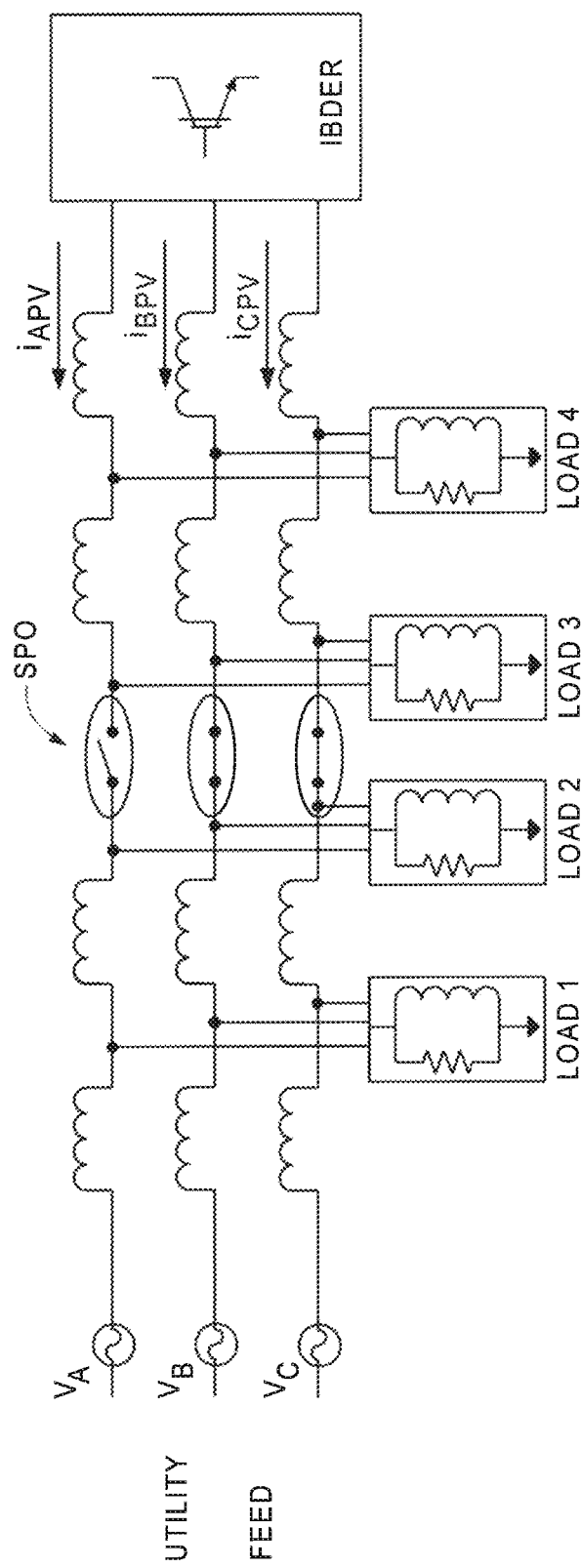
FIG. 1 is a schematic diagram of a three-phase distribution circuit that hosts a grid-following IBDER and is experiencing a SPO.
Figure 2:
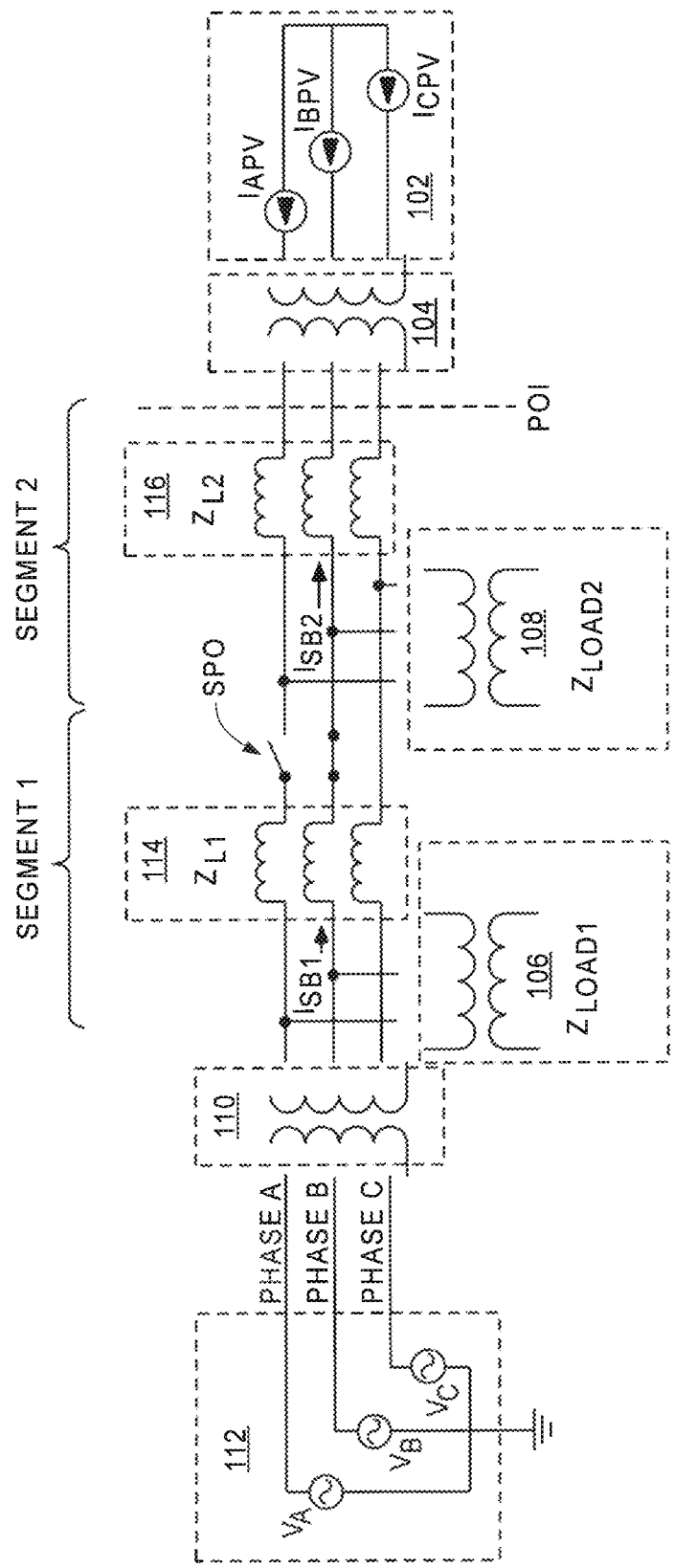
FIG. 2 is another schematic diagram of a three-phase distribution circuit that hosts a grid-following IBDER and is experiencing a SPO.

Depicted in FIG. 2 is a schematic diagram of a simplified generic distribution circuit 100. Circuit 100 generally includes IBDER 102, generation-step-up (GSU) transformer 104, first load 106, second load 108, substation transformer 110, utility substation 112, circuit segment 1 114, and circuit segment 2 116. IBDER 102 may be a photoelectric array, or any other inverter-based power source, and is coupled through GSU transformer 104. For simplicity, loads 106, 108, can be assumed to have constant impedances $Z_{load1}$ and $Z_{load2}$, respectively, and are connected phase-to-ground. IBDER 102 is connected to the grid at a point-of-interconnection POI. Phase A is experiencing an open circuit at SPO.

The worst-case scenario occurs if there is a near-unity generation-to-load balance in the circuit segment downstream from the SPO (Segment 2), because a generation-to-load balance far from unity would tend to cause the voltage to be abnormally high or low, producing a condition that could be detected by other means.

The phase-to-ground voltage ($V_{PPP.B}$) at the point of interconnection (POI) on the still-closed Phase B is given by:

$$V_{POI.B} = V_b - Z_{L1}I_{SB1} - Z_{L2}I_{SB2} \quad \text{Eq. (1)}$$

where the variables (all of which are complex vector quantities) are:
$V_b$: Phase B utility voltage
$Z_{L1}$: Segment 1 line impedance
$Z_{L2}$: Segment 2 line impedance
$I_{SB1}$: Phase B current, Segment 1
$I_{SB2}$: Phase B current, Segment 2

Equation (2) is obtained by substituting $I_{SB2} = -I_{BPV}$ into Equation (1):

$$V_{POI.B} = V_b - Z_{L1}I_{SB1} + Z_{L2}I_{BPV} \quad \text{Eq. (2)}$$

where $I_{BPV}$ is the value of the IBDER output current on Phase B.

The phase-to-ground POI voltage on the open Phase A, however, is given by:

$$V_{A.POI} = (Z_{L2} + Z_{load2})I_{APV} \quad \text{Eq. (3)}.$$

The magnitudes of the line impedances $Z_{L1}$ and $Z_{L2}$ are much smaller than those of the load impedances $Z_{load1}$ or $Z_{load2}$. As loads switch on and off during normal use, the load impedances $Z_{load1}$ and $Z_{load2}$, and the source current $I_{SB1}$, vary statistically over relatively wide ranges. Over 2-20 seconds, the values of the line impedances $Z_{L1}$ and $Z_{L2}$ and the value of the DER output phase currents $I_{APV}$, $I_{BPV}$ and $I_{CPV}$ are constant, and the variation in phase-to-ground voltage at the POI on phase B is approximately:

$$\Delta V_{B.POI} \approx Z_{L1}\Delta I_{SB1} \quad \text{Eq. (4)}.$$

The short-term variation in the POI voltage on the open Phase A is approximated by:

$$\Delta V_{A.POI} \approx (Z_{L2} + \Delta Z_{load2})I_{DA} \quad \text{Eq. (5)}.$$

The quantity $\Delta V_{B.POI}$ in Equation (4) is inherently small, but in Equation (5), the parameter that is varying ($\Delta Z_{load2}$) is multiplied by a quantity that is large ($I_{DA}$). Thus, it is expected that when a single-phase open circuit occurs at an arbitrary location along the circuit, the statistical distribution of voltages on the open phase becomes much wider than on any phase still connected to the grid source. And, the standard deviation of the phase-ground voltage on the opened phase becomes much larger than that on any still-closed phase.

Accordingly, it is possible to detect the presence of a SPO by analyzing per-phase voltage standard deviation (PPVSD) using the following algorithm:

1. At each sample interval k, calculate standard deviation of the voltage on each phase, averaged over an N-point buffer covering at least 15 seconds worth of samples:

$$\langle vx(k) \rangle = \{StDev[v_x(k)]\}_{x=a,b,c} \quad \text{Eq. (6)}$$

2. For each $k^{th}$ update, determine the minimum and maximum phase voltage standard deviations:

$$\langle v_x(k) \rangle_{min} - \min_{x=a,b,c} \langle v_x(k) \rangle \quad \text{Eq. (7)}$$

$$\langle v_x(k) \rangle_{max} - \max_{x=a,b,c} \langle v_x(k) \rangle \quad \text{Eq. (8)}$$

3. For each sample instant k, compute the difference D between the largest and smallest per-phase standard deviations:

$$D(k) = \langle v_x(k) \rangle_{max} - \langle v_x(k) \rangle_{min} \quad \text{Eq. (9)}$$

4. An SPO is detected if, for all k in the buffer, the value of D exceeds about 20 V (i.e., the RMS voltage standard deviation of the highest-standard-deviation phase is at least about 20 V higher than that of the lowest-standard-deviation phase continuously for 15 seconds).

Figure 3:
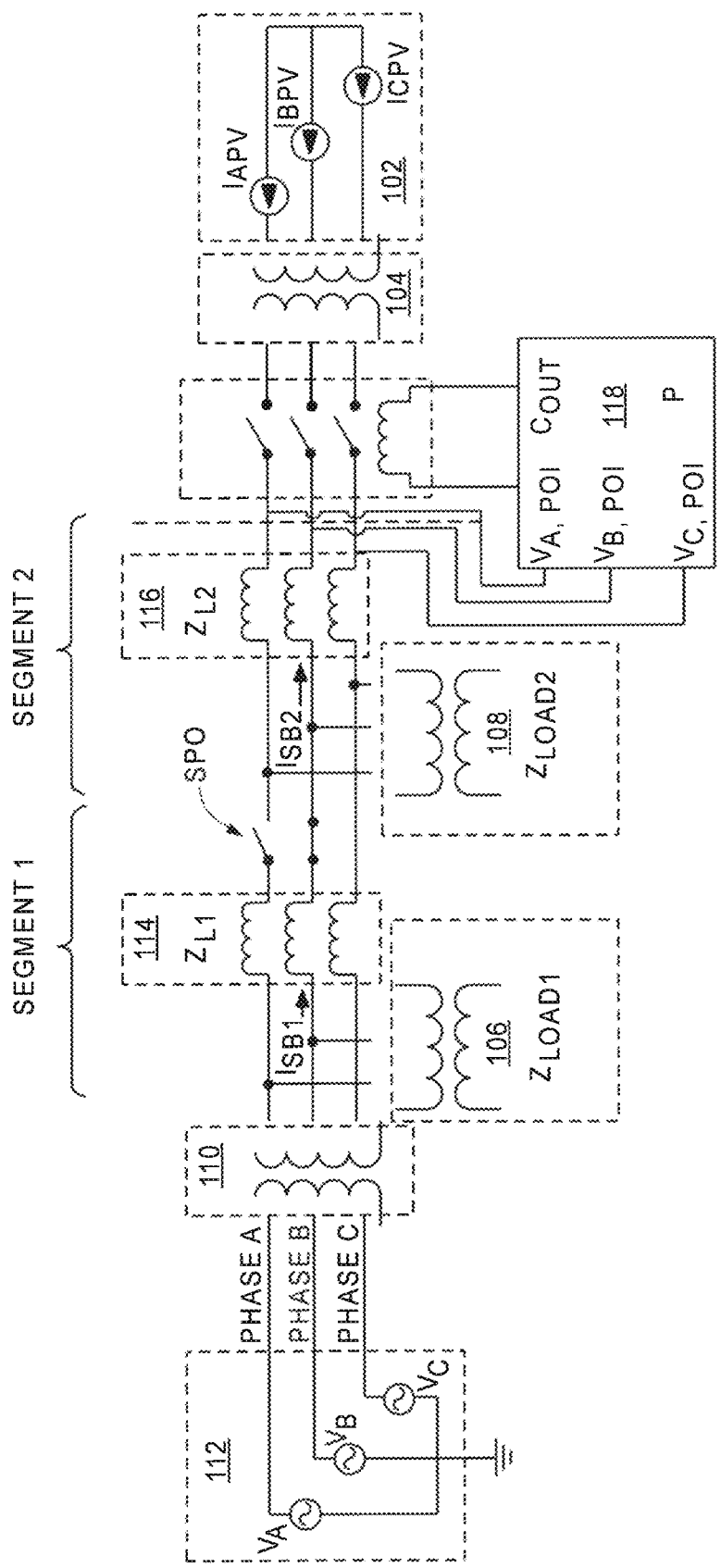
FIG. 3 is a schematic diagram of a three-phase distribution circuit with apparatus according to an embodiment of the invention, where the circuit includes a grid-following IBDER and the circuit is experiencing a SPO.
Figure 4A:
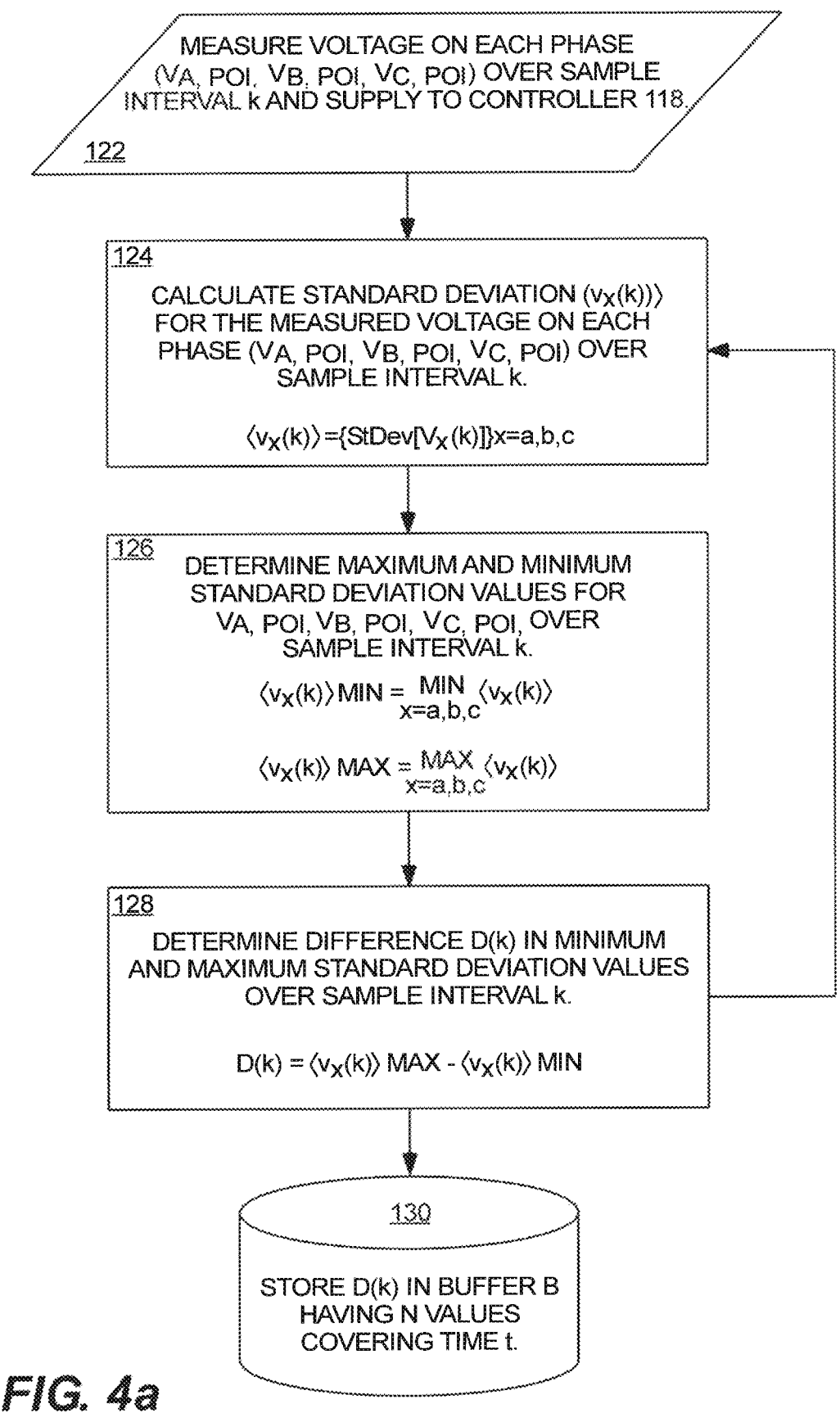
FIG. 4a is a simplified process flow diagram of the first portion of a method according to an embodiment of the invention.
Figure 4B:
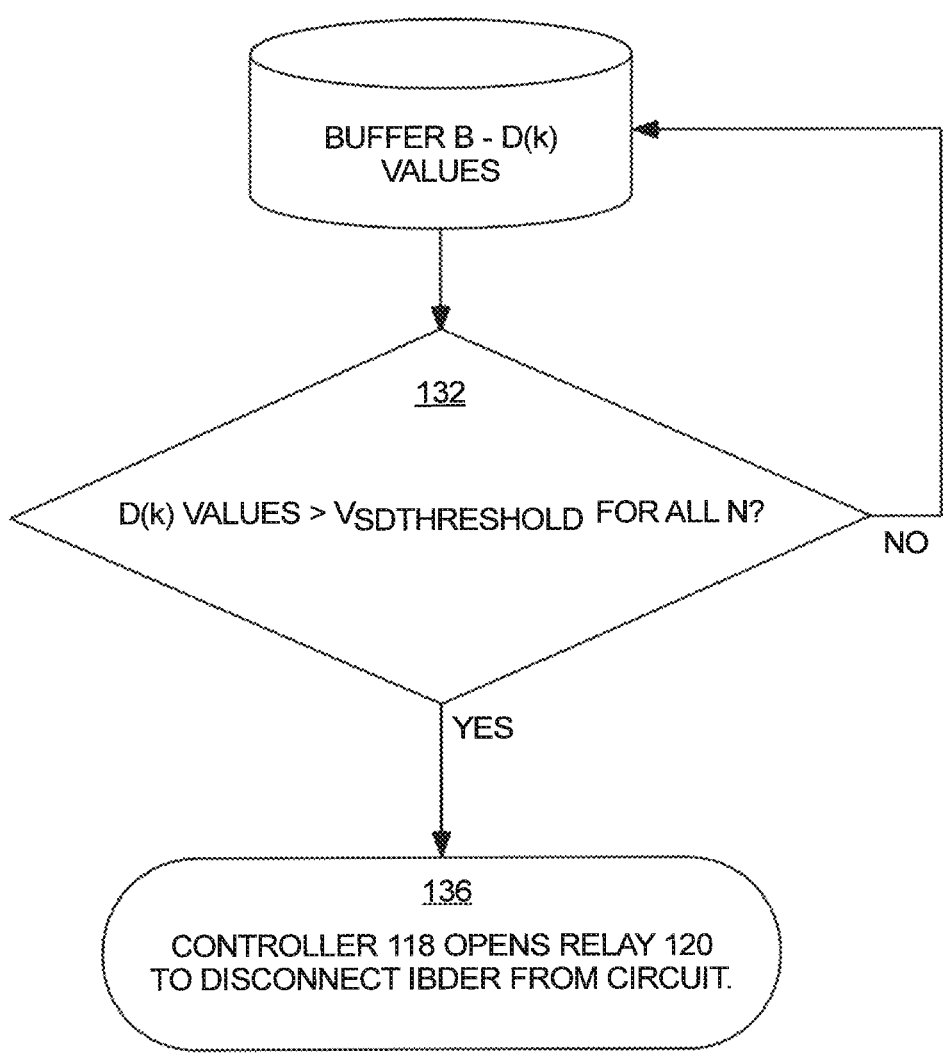

The algorithm can be implemented in circuit 100 as schematically depicted in FIGS. 3, 4a and 4b. Controller 118 has a processor P programmed with the algorithm described above, and receives per-phase voltage measurement inputs $V_{A.POI}$, $V_{B.POI}$, $V_{C.POI}$. Processor P is associated with buffer B, containing sufficient storage for N values corresponding to time t. Preferably, time t covers about 15 seconds, but can be more or less, depending on the degree of sensitivity desired. The number of values N is selected to correspond with the sample intervals k. For example, if k=1 second, N=15 to cover a t of 15 seconds.

As depicted in the simplified process flow diagram of FIG. 4a, in first step 122 voltages $V_{A.POI}$, $V_{B.POI}$, $V_{C.POI}$, are continuously measured and the voltage measurements are supplied to inputs of controller 118. At second step 124, processor P calculates the standard deviation for each of $V_{A.POI}$, $V_{B.POI}$, $V_{C.POI}$, over a sample interval k. As previously mentioned, sample interval k can be set to any suitable value, preferably 1 second. At third step 126, the calculated standard deviation values for the sample interval k are assessed to determine the maximum $\langle v_x(k) \rangle_{max}$ and minimum $\langle v_x(k) \rangle_{min}$ standard deviation values. At fourth step 128, $\langle v_x(k) \rangle_{min}$ is subtracted from $\langle v_x(k) \rangle_{max}$ to obtain a difference value D(k) which is then stored in buffer B at fifth step 130 to await further processing. The process returns to step 124 to process the next sample interval k.

Once N values are stored in buffer B, a second stage of the process, as depicted in the simplified process flow diagram of FIG. 4b, continues with processor P assessing the stored values of D(k) in buffer B at sixth step 132. The number of values N in buffer B can be selected to provide a suitable balance of selectivity and sensitivity in the method. Generally, it is desirable for the number of values N to cover a time period t of at least 15 seconds to avoid false SPO indications stemming from circuit events such as transient load variations. Once a new value D(k) is stored in buffer B, a corresponding oldest value is deleted.

A threshold value $V_{SDThreshold}$ can be set to establish the acceptable level of variation in the voltage standard deviation amongst the phases. This can be set to any suitable value, but generally 20V is thought to provide a suitable balance of selectivity and sensitivity in the method. If the D(k) values do not exceed $V_{SDThreshold}$ for all N, the D(k) values in buffer B are reassessed upon the next update with a new sample interval k. If the D(k) values are found to equal or exceed $V_{SDThreshold}$ for all N, at step 136 controller 118 sends signal $C_{out}$ to open relay 120, thereby disconnecting IBDER 102 from circuit 100. Relay 120 is preferably normally closed and requires a manual reset from the open position to enable line workers to determine the location of the SPO and repair it prior to reconnection of IBDER 102. Relay 120 being open will cause there to be no voltage at IBDER 102, which will then avoid cycling on and off.

Alternatively, signal $C_{out}$ can be sent directly to IBDER 102 itself. Through a suitable algorithm, IBDER 102 could then power down until manually restarted.

Testing

For purposes of practicality, the PPVSD method was studied in simulation in a MATLAB/Simulink® environment to test efficacy of the algorithm.

A. Circuit Modeling

Circuit data were obtained from two New York based utilities. Detailed models of four circuits, a "strong" and a "weak" circuit from each of the two utilities, were then built and validated from the provided circuit data. Generally, a "weak" circuit has higher impedance relative to a "strong" circuit. The four circuits are described as follows:

| Circuit Number | Circuit Miles | Min/Max Loading (KW) | Fault Current (A) at head/distal points | Voltage(s) Level (kV) |
|---|---|---|---|---|
| 1 (strong) | 4.43 | 801, 5083 | 7572, 1626 | 13.2 |
| 2 (weak) | 8.5 | 595, 7278 | 3703, 606 | 13.2 |
| 3 (strong) | 1.5 | 664, 1464 | 3408, 1880 | 13.2 |
| 4 (weak) | 10 | 411.9, 1236 | 8680, 1033 | 13.2, 4.8, 34.5 |

1. IBDER Modeling

The IBDERs used in the modeling were all photovoltaic plants. Three specific inverters were modeled, all represented by detailed EMT models developed and validated in collaboration with the manufacturers. These inverters span a range of hardware topologies, anti-islanding strategies, and both transformer-isolated and transformer-less designs. Two of the models were switch-averaged, and one was switched. One of the inverters uses an anti-islanding method from Group 1, and another is from Group 2B as characterized in S. Gonzalez, E. Abraham, M. Ropp. C. Mouw, D. Schutz, S. Perlenfein, Sandia National Laboratories report SAND2018-8421, "Unintentional Islanding Detection Performance with Mixed DER Types", August 2018. The third inverter model (the switched model) did not include anti-islanding. All three models were validated against laboratory data for steady-state and transient behaviors, and the switched model received additional validation against laboratory transient overvoltage and fault-current tests. All of the models include the manufacturers' current regulators, line synchronization means (PLLs), and maximum power point trackers.

IEEE 1547-2018 Category III settings were used in the modeled inverters, to keep the IBDERs online longer and make a SPO harder to detect. The models also included inverter internal transient overvoltage protection that trips if the instantaneous (not RMS) voltage exceeds 1.4 pu for more than 1 ms. The inverter models did not include any overcurrent protection. The IBDER plant GSU transformer was YG:yg for all cases.

2. Load Modeling

Because the detection mechanism relies on the variability of the load impedance, it was essential that the randomly varying nature of real-world loads be realistically represented in the model. The typical approach using a controlled current source driven in part by a randomly generated power command, resulting in a load with constant-power V-I characteristics was used. The load was thus represented by a randomly varying PQ (current-controlled) part, and a fixed-value constant-impedance base load. A uniform distribution was used for the load variation. For all simulation cases that did not include motor load, the base load was set at 80% and the varying load comprised the remaining 20%.

3. Selection of SPO Location

Placing the SPO at the point electrically farthest upstream from the POI is believed to be the worst-case scenario because this will maximize the statistical averaging of the voltages by the distributed loads and lead to the smallest voltage variation on the open phase. This supposition was confirmed by the simulation tests. Thus, the IBDER was connected to the distal end of the three-phase trunk of each circuit, and the SPO was located at the head (substation) end of the three-phase trunk.

Figure 5:
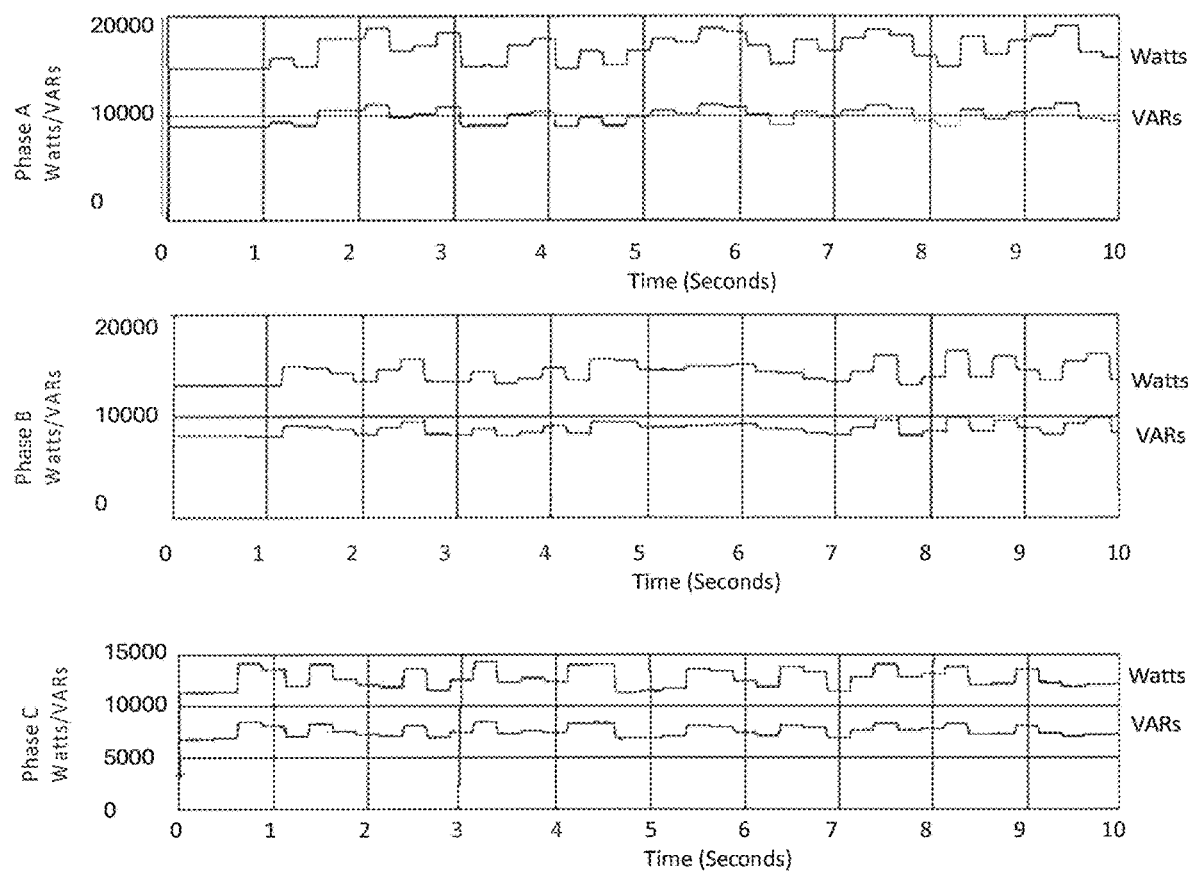
FIG. 5 depicts the real (Watts) and reactive (Volt-Amperes Reactive) power draw of each phase of one randomly varying, single load block over time.
Figure 6:
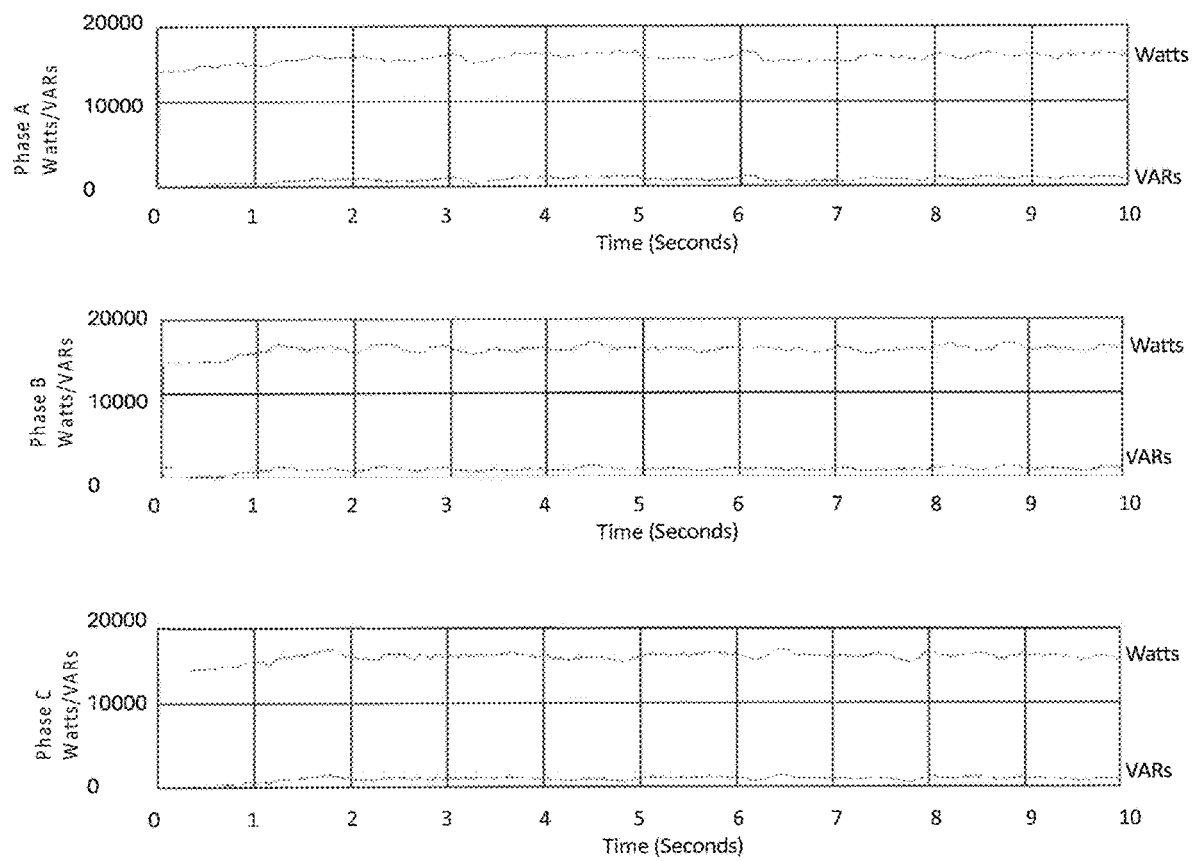
FIG. 6 depicts the randomly varying per-phase real (Watts) and reactive (Volt-Amperes Reactive) power of an entire circuit, showing the overall smoothing that occurs when load variations are non-correlated and randomly varying.

FIG. 5 depicts an example of the real (Watts) and reactive (Volt-Amperes Reactive) power draw of each phase of one randomly varying load block. These are unbalanced single-phase loads, and the variation is not synchronized between phases. FIG. 6 depicts the randomly varying per-phase real and reactive power of an entire circuit, showing the overall smoothing that occurs when the load variations are non-correlated and randomly varying.

4. Grounding Transformer

Because a low-impedance YG:d grounding transformer creates an especially effective voltage reconstruction method, tests were performed with and without a grounding transformer on the MV (distribution circuit) side of the IBDER GSU transformer. The grounding transformer was a YG:d transformer with calculated reactance and resistance, and with the reactance set to be 60% of the connected PV base impedance and X/R=5.

5. Motor Load

Three-phase induction machines also can reconstruct voltage on the open phase, so simulations were conducted with a 200 hp (149.2 kW) three-phase induction machine added to each circuit's midpoint. The motor has a squirrel-cage rotor type and uses MATLAB's preset model #7 (200 hp, 1785 rpm). The electrical part of the machine is represented by a fourth-order state-space model and the mechanical part by a second-order model. The motor was sized to account for roughly ⅓ of the total load drawn downstream of the SPO, so the ratio of dynamic load to fixed load was increased (30% dynamic, 70% fixed) to retain approximately the same level of dynamic load movement as was achieved in tests without the motor present.

6. Loading Conditions

The Loading Fraction (LF) used in these simulations is defined as a percentage of the total connected load (TCL), where the TCL was estimated to be 3.065 MVA for Feeder 1, 6.654 MVA for Feeder 2, 1.464 MVA for Feeder 3 and 4.12 MVA for Feeder 4. The power factor values given are the uncompensated values, meaning that they are the power factors of the loads alone without including the effects of the utility capacitors.

To test the false trip immunity of the PPVSD method, tests were run that included switching of single-phase induction machine (SPIM) load. The SPIM used was a capacitor-start capacitor-run unit rated at 15 hp (~11.2 kW).

SPO detection tests were conducted on all four feeders. The following parameters were varied:
  a. Inverter used (#1, #2 or #3)
  b. Anti-islanding on and off;
  c. Grounding transformer present or absent; and
  d. Three-phase motor load present or absent.

Figure 19:
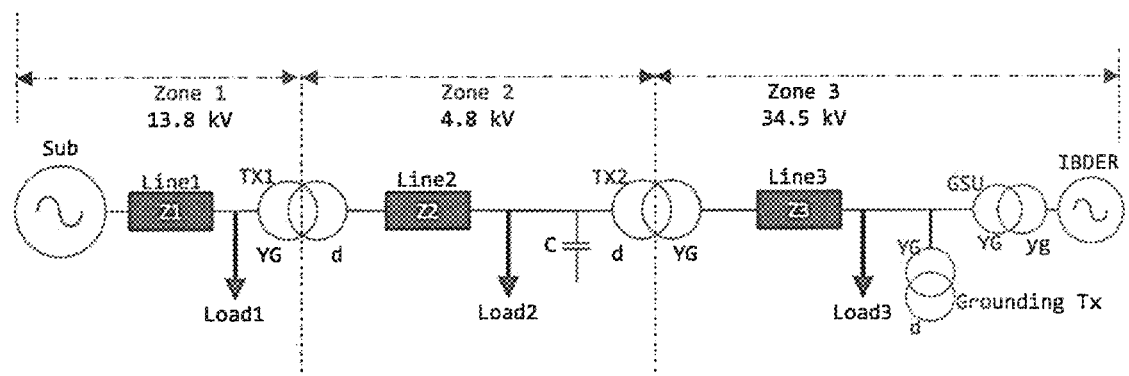
FIG. 19 is a schematic diagram of a three-phase distribution circuit with multiple voltage segments and multiple inline transformers.

Feeder #4 as depicted in FIG. 19 presented an additional opportunity. This circuit is served at 13.2 kV from its source substation, but then it transitions to 4.8 kV via an ungrounded-Y to delta inline transformer, and then to 34.5 kV via a delta to grounded-Y inline transformer. Thus, this circuit was used to study the ability to detect an SPO occurring in different parts of the circuit, and how transformer configuration impacts the visibility of the SPO from the POL.

B. Testing Results

Selectivity or false trip immunity is also important, and a number of selectivity tests were run using large motor starts. In general, switching or similar events that might be expected to lead to large voltage standard deviations when there is no SPO present cause short-lived change in per-phase voltage standard deviations. Because an SPO does not have to be detected especially quickly, with several utilities indicating that detection times as much as tens of seconds would be acceptable, time delays are the primary tool used to improve the selectivity of the PPVSD method.

The cases selected for presentation herein are those from the circuit (Feeder 2) and the IBDER (Inverter 1) that produced the lowest differences between per-phase voltage standard deviations, so these are the cases that resulted in the lowest margins for SPO detection by the PPVSD method.

1. SPO Detection with and without a Grounding Transformer

Figure 7:
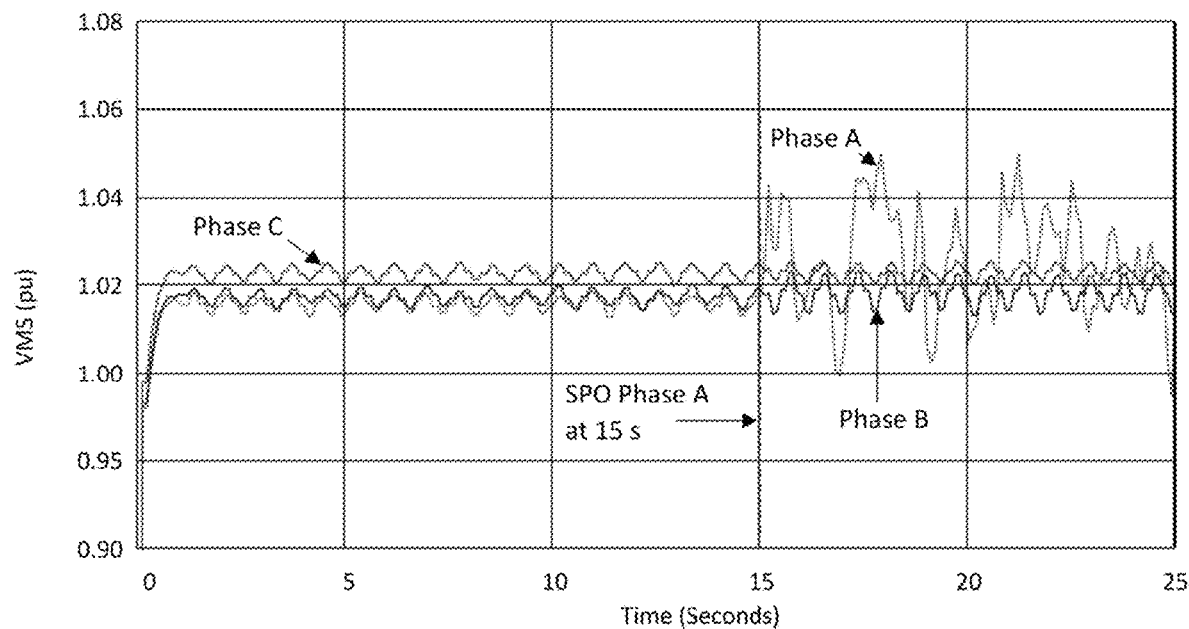
FIG. 7 depicts an example of per-phase RMS voltages at the POI during an SPO occurring at t=15 s, with a unity generation-to-load balance on the opened phase, and wherein the circuit does not include a grounding transformer.
Figure 8:
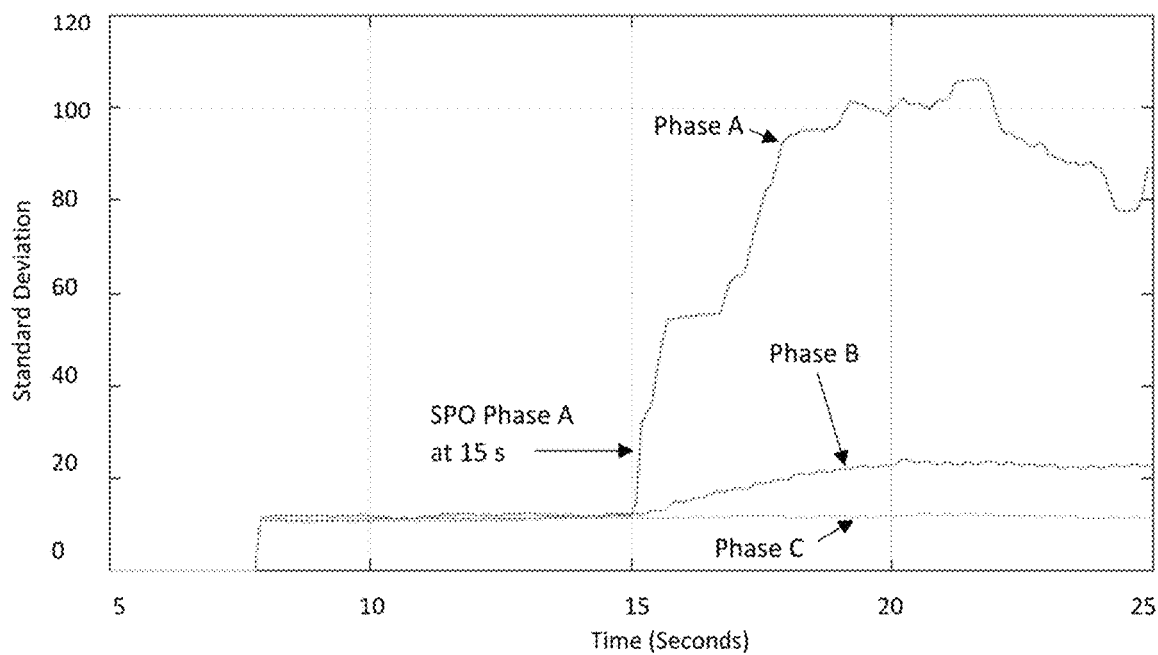
FIG. 8 depicts the windowed-average standard deviation of the RMS phase-to-ground voltages in the example of FIG. 7.

FIG. 7 depicts the per-phase RMS voltages at the POI during an SPO on Circuit #2 occurring at t=15 s. Circuit #2 hosts an IBDER represented by inverter model #1. The circuit loading is set such that there is a unity generation-to-load balance on the opened phase. This case does not include a grounding transformer or motor load. FIG. 8 shows a windowed-average standard deviation of the RMS phase-to-ground voltages. The two terms on the right-hand side of Equation (9) consistently differ by a factor of more than 20 once the SPO is formed, and this case is easily detected by the PPVSD method.

Figure 9:
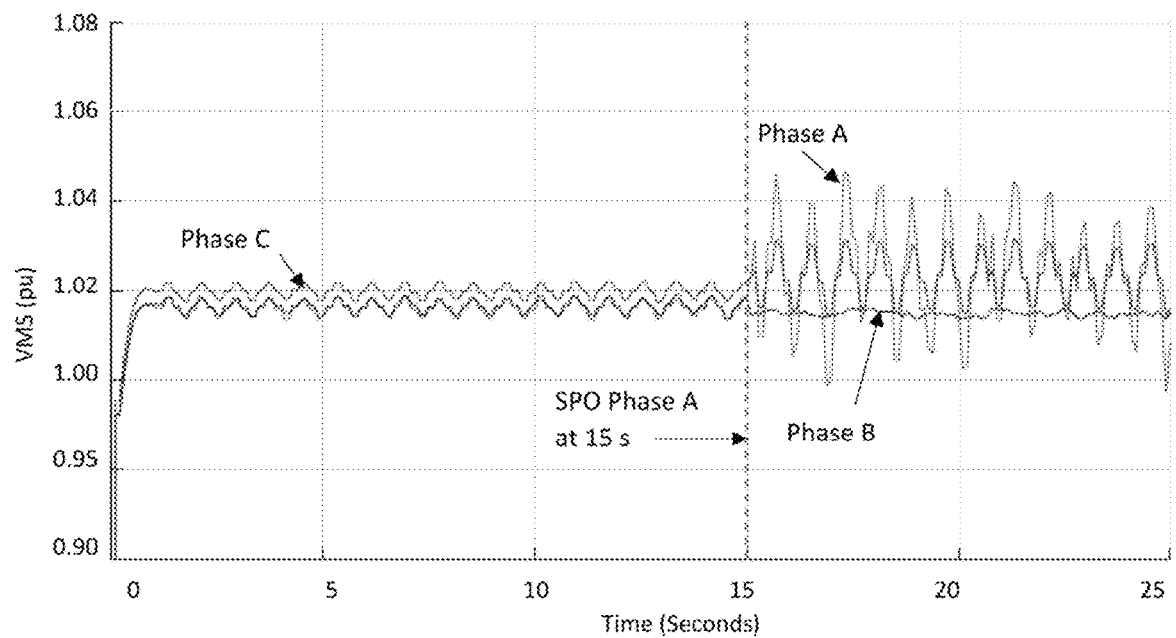
FIG. 9 depicts an example of per-phase RMS voltages at the POI during an SPO occurring at t=15 s, with a unity generation-to-load balance on the opened phase, and wherein the circuit includes a grounding transformer.
Figure 10:
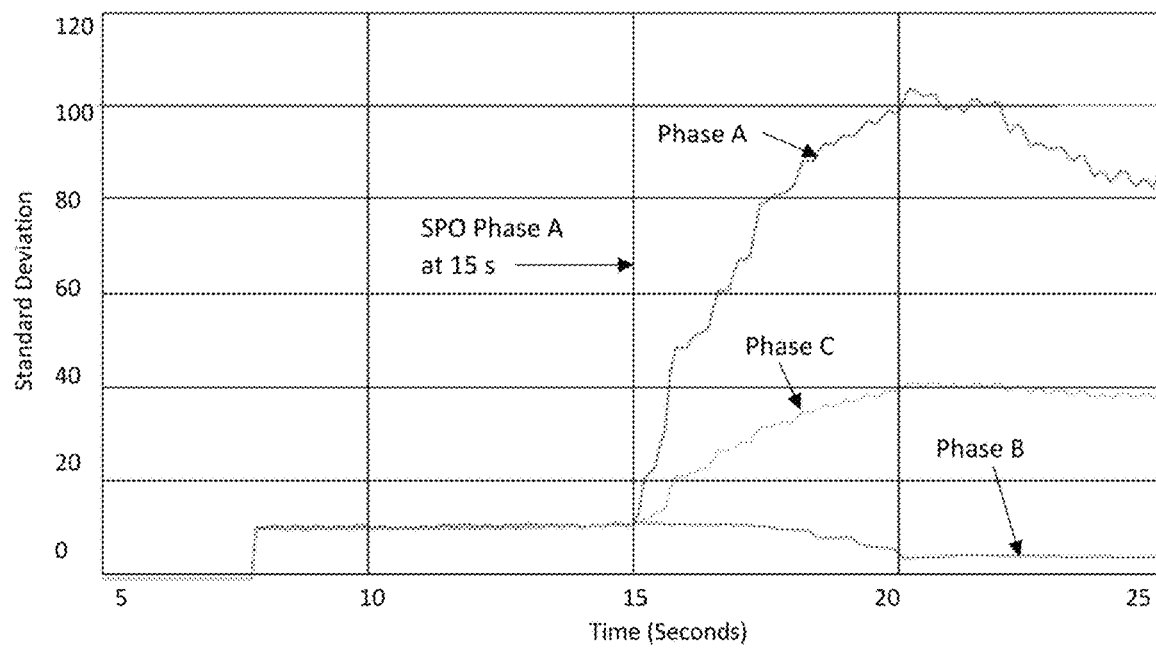
FIG. 10 depicts the windowed-average standard deviation of the RMS phase-to-ground voltages in the example of FIG. 9.

FIGS. 9 and 10 show the same case (Circuit #2, Inverter #1), but with a grounding transformer included. The voltage standard deviation on the open phase remains similar to the case without a grounding transformer, and the standard deviations of the still-closed phases shift slightly due to the low-impedance zero-sequence path provided by grounding transformer, but the value of D in Equation (9) is actually slightly higher than in the case without the grounding bank because one still-closed phase sees a slight increase in voltage standard deviation but the other sees a small decrease. The SPO is still readily detected by the PPVSD.

2. Motor Start after SPO Formation

Figure 11:
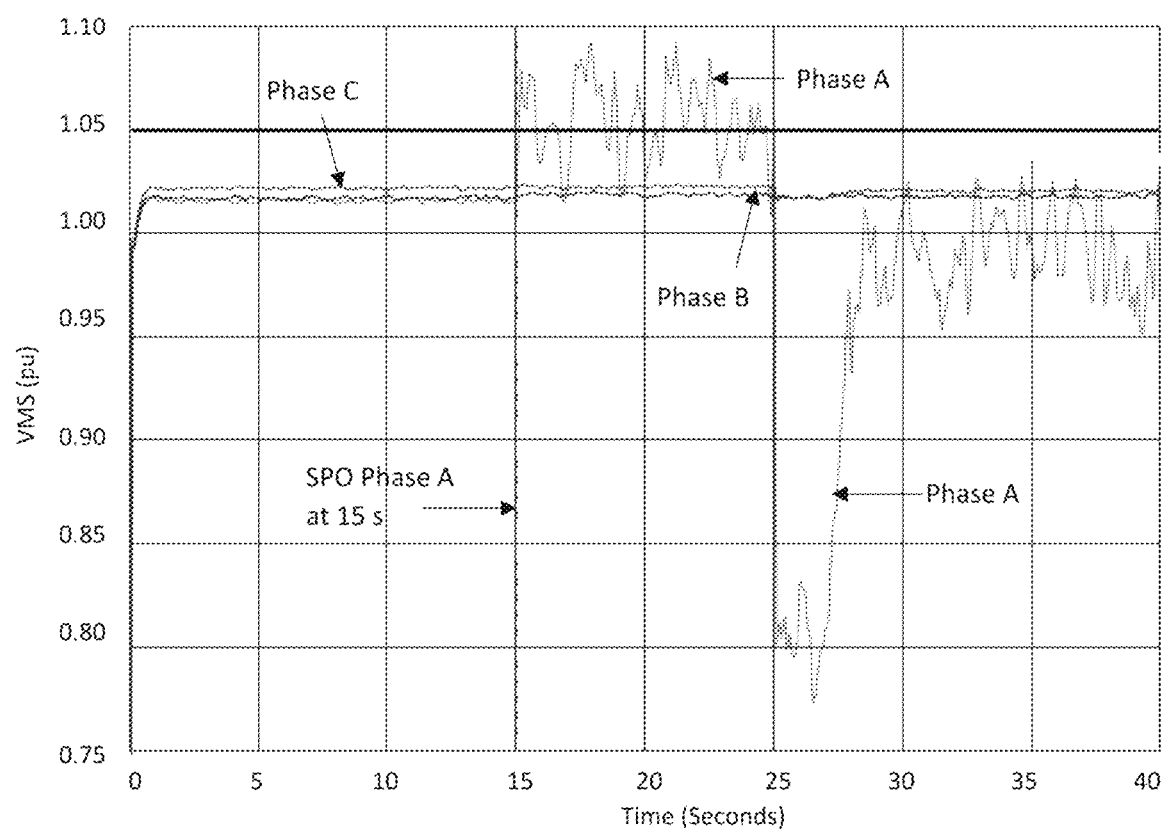
FIG. 11 depicts the RMS phase-ground voltages at the POI, with a SPO formed on one phase at t=15 s and a single-phase induction machine (SPIM) start on the same phase at t=25 s.
Figure 12:
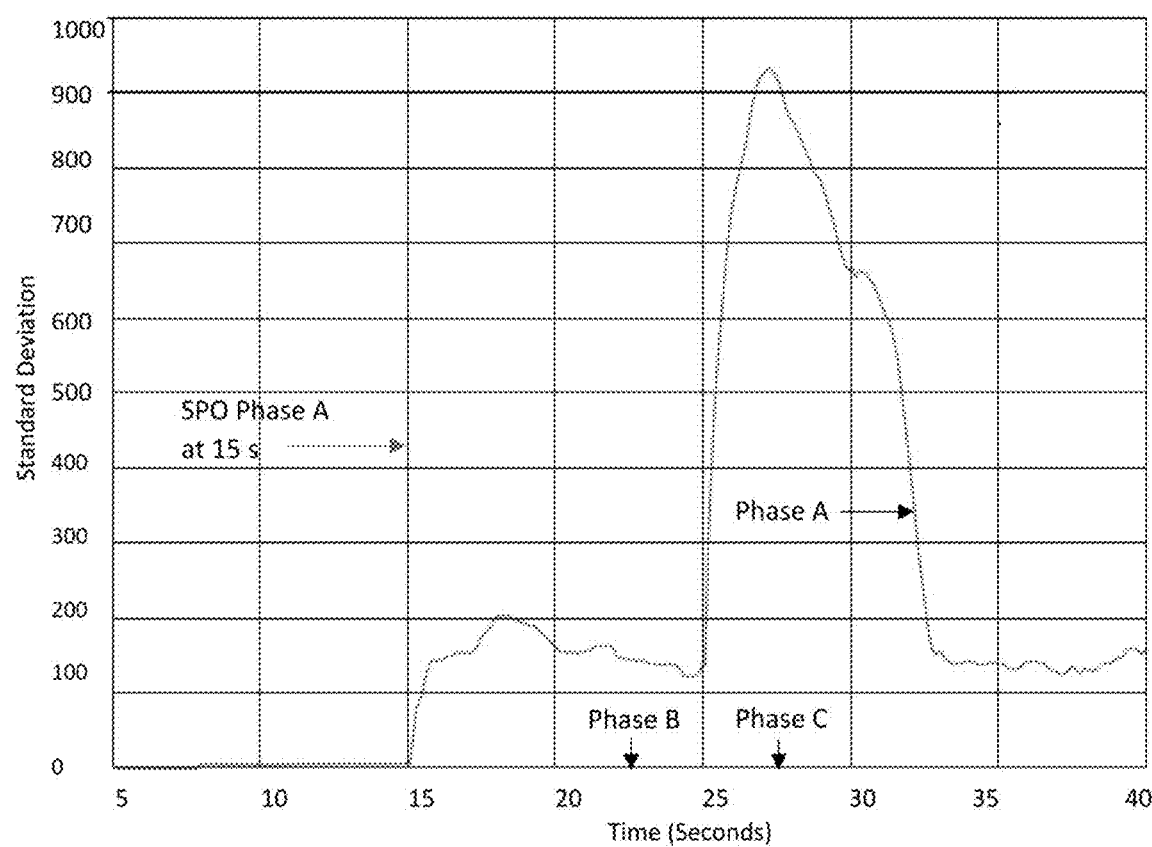
FIG. 12 depicts the windowed-average standard deviation of the RMS phase-to-ground voltages in the example of FIG. 11.

The effect on the PPVSD method of single-phase induction machine (SPIM) starts after formation of the SPO was also studied. FIG. 11 depicts the RMS phase-ground voltages at the POI and FIG. 12 shows the windowed standard deviations of the phase-ground voltages for a case on Circuit #2 with Inverter #1 in which a 15 hp SPIM starts on phase A at t=25 s, after the SPO has formed on phase A at t=15 s. The results are similar: when a motor starts downstream from the SPO, the voltage variation becomes larger and PPVSD detection of the SPO is not inhibited.

Figure 13:
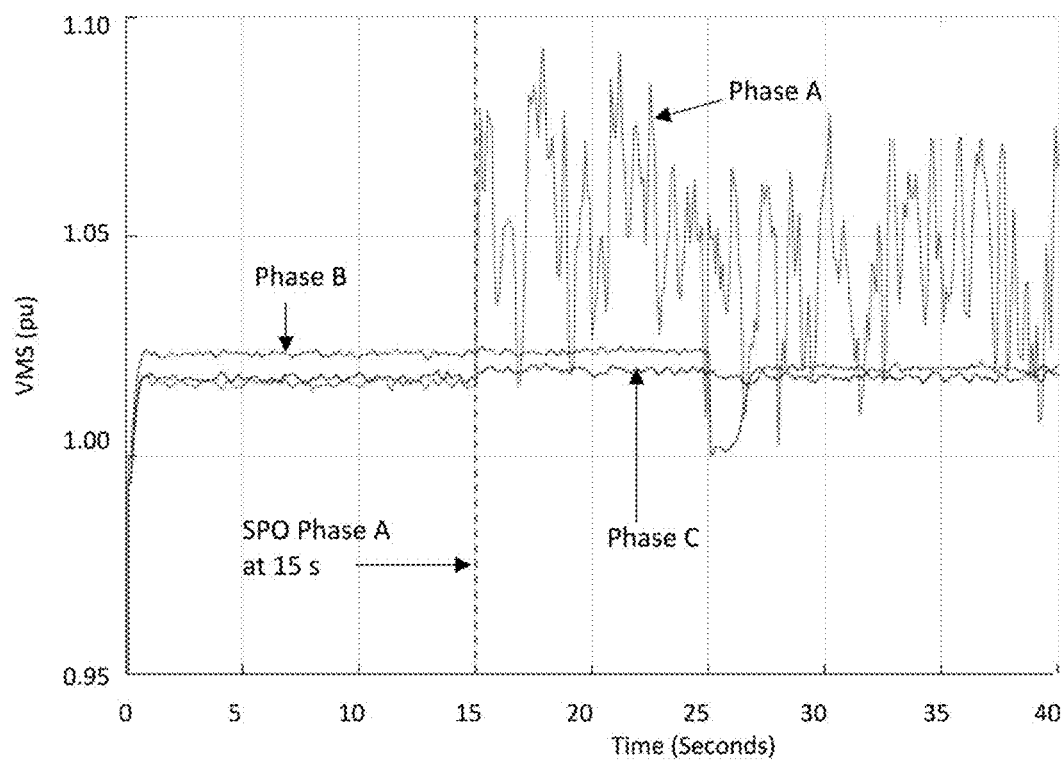
FIG. 13 depicts the RMS phase-ground voltages at the POI with a SPO formed on one phase at t=15 s and a single-phase induction machine (SPIM) start on a different, still-closed phase at t=25 s.
Figure 14:
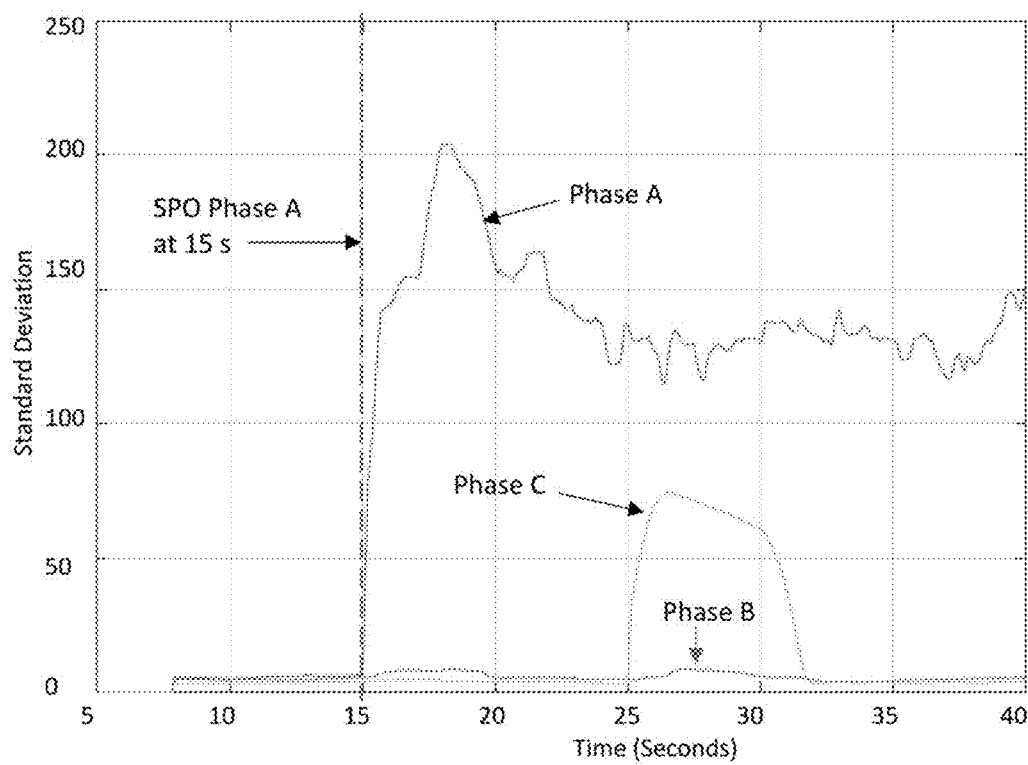
FIG. 14 depicts the windowed-average standard deviation of the RMS phase-to-ground voltages in the example of FIG. 13.

FIG. 13 depicts the RMS phase-ground voltages at the POI and FIG. 14 shows the windowed standard deviations of the phase-ground voltages for a case on Circuit #2 with Inverter #1 in which a 15 hp SPIM starts on Phase C at t=25 s, after the SPO has formed on phase A at t=15 s. In this case the SPIM that starts is on one of the still-closed phases, but downstream from the location of the SPO on phase A. FIG. 14 shows that the standard deviation of the POI RMS voltage on Phase C jumps when the motor starts, but the Phase B voltage remains relatively unchanged. Because the PPVSD uses the two phases with the highest and lowest standard deviations in its calculation, the startup of the SPIM on the still-closed phase does not impact the ability of the PPVSD to detect the SPO.

3. False-Trip Immunity: Three-Phase Motor Start Prior to SPO Formation

Figure 15:
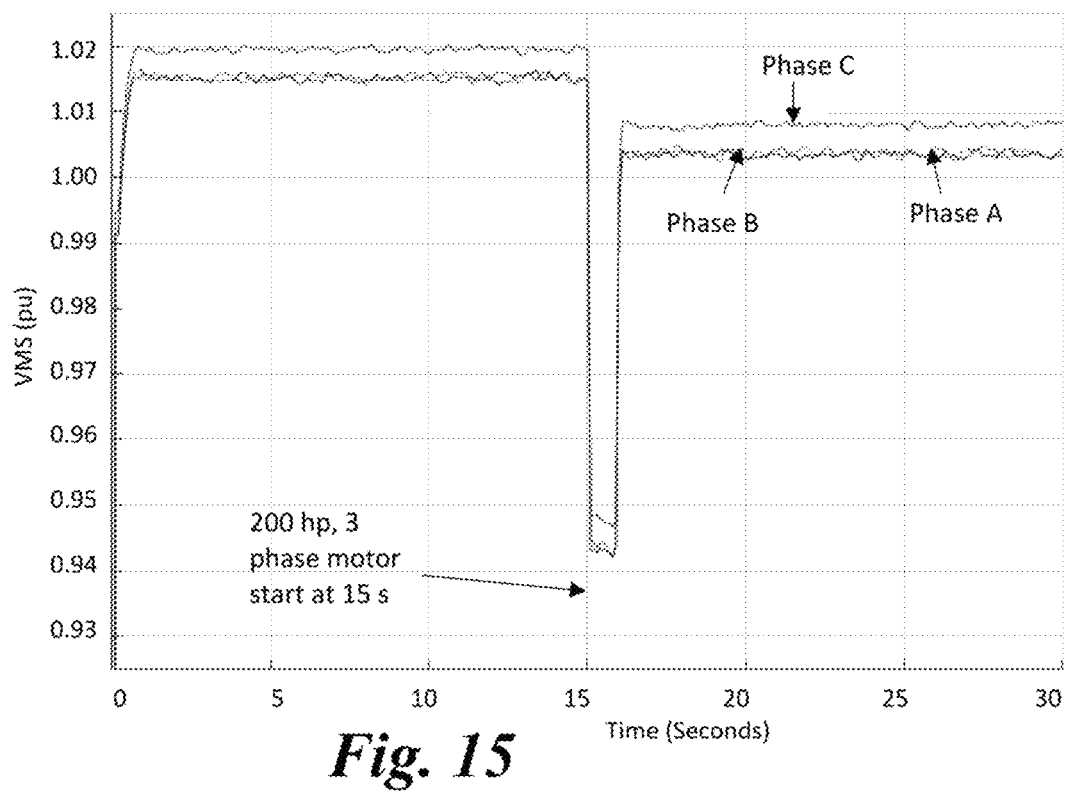
FIG. 15 depicts the RMS phase-ground voltages at the POI without a SPO and a three-phase motor start at t=15 s.
Figure 16:
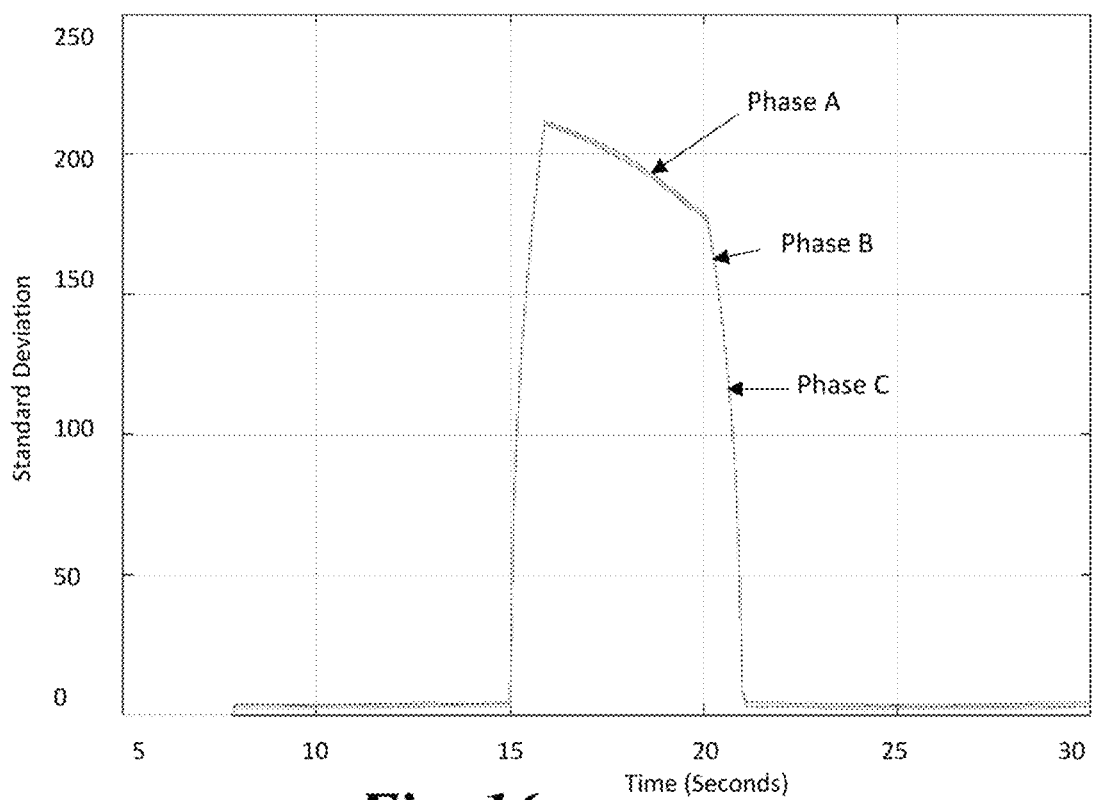
FIG. 16 depicts the windowed-average standard deviation of the RMS phase-to-ground voltages in the example of FIG. 15.

FIG. 15 shows the RMS phase-ground voltages vs time, and FIG. 16 shows the windowed voltage standard deviation for each phase voltage, for a startup of the three-phase induction machine prior to formation of an SPO. This is a ride-through case: no SPO is present and it is desired that the PPVSD not indicate a trip. The circuit was loaded so that after the motor reached steady-state there would be a roughly unity generation-to-load ratio on the circuit. The large reactive power draw as the motor starts causes the phase voltages to drop by about 2% of nominal for roughly one second as the motor comes up to speed. FIG. 16 shows that there is a large spike in the standard deviation of voltage on each phase, but the three phases track together, showing essentially the same voltage standard deviation. Thus, the value of D in Equation (9) stays small, and the PPVSD rides through as it should.

4. False-trip Immunity: Single-phase Motor Start Prior to SPO Formation

Figure 17:
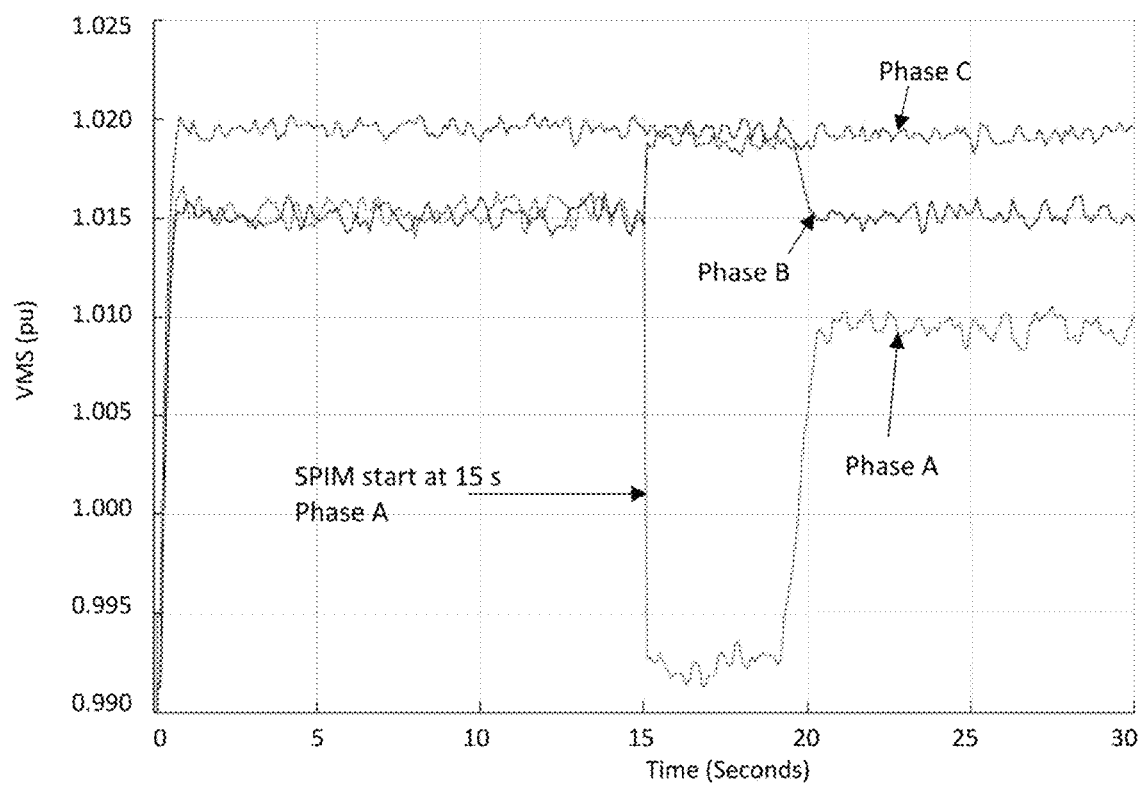
FIG. 17 depicts the RMS phase-ground voltages at the POI without a SPO and a single-phase induction machine (SPIM) start at t=15 s.
Figure 18:
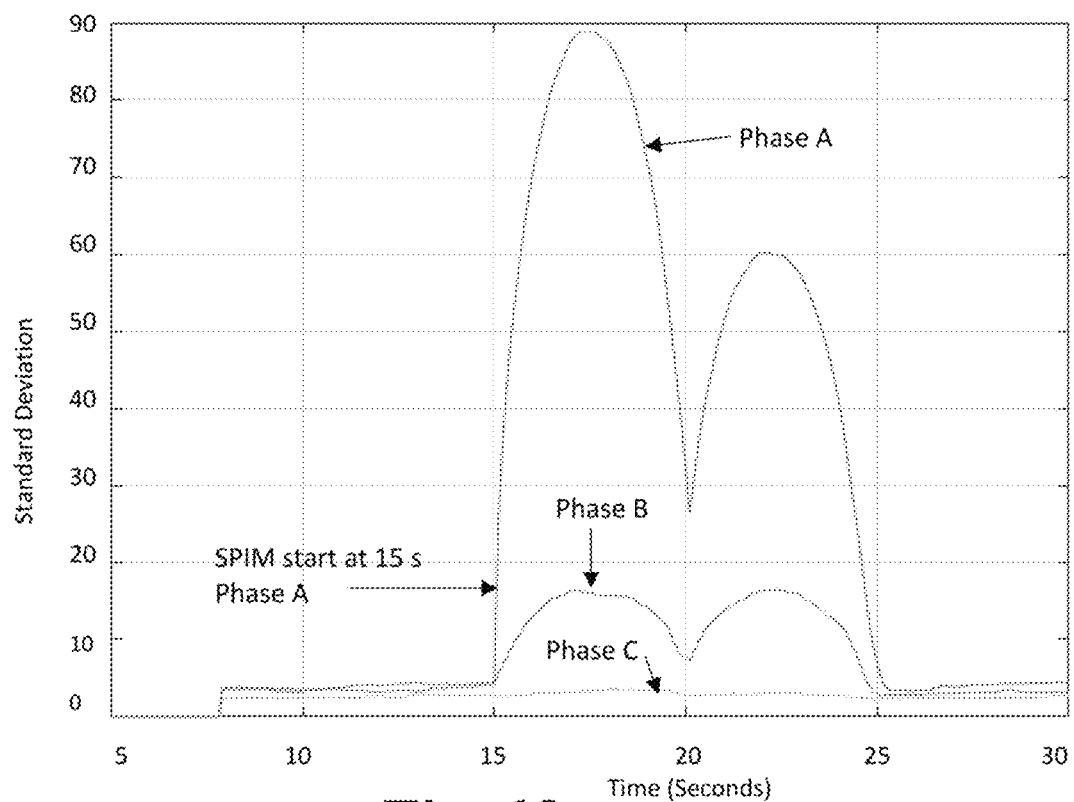
FIG. 18 depicts the windowed-average standard deviation of the RMS phase-to-ground voltages in the example of FIG. 17.

FIG. 17 shows the RMS phase-ground voltages vs time and FIG. 18 shows the windowed voltage standard deviation for each phase voltage for a startup of the 15 hp SPIM on Phase A prior to formation of an SPO. In this simulation the SPIM's starting capacitor has been disabled, representing a situation in which the starting capacitor's switch has failed open, an abnormal condition that represents a particularly difficult false-trip-immunity case. FIG. 17 shows the expected voltage change associated with the starting of the large SPIM, and FIG. 18 shows a corresponding large change in voltage standard deviation. The magnitude of the change in phase A POI voltage standard deviation is similar to that seen in SPO cases, but its duration is limited; the standard deviation on phase A remains elevated for about 10 seconds. The 15 second time delay selected for the PPVSD method is sufficient so that this case does not result in a false detection.

5. Impact of Inline Transformers

FIG. 19 depicts in exemplary fashion the model used for Circuit #4, which has multiple voltage segments and multiple inline transformers. Zone 1 includes a grid power connection Sub, Line 1 with line impedance Z1, a connected Load1, and a YG:d transformer TX1 to step down the voltage from the 13.8 kV supplied by the grid to 4.8 kV. Zone 2 is a 4.8 kV segment having Line 2 with a line impedance of Z2, a connected Load 2 To test the impact of this circuit configuration on the performance of the PPVSD, three cases were tested:

Case 1A: SPO occurs at 13.2 kV, POI is on the 4.8 kV bus (Y:d transformer between the SPO and the POI);
Case 1B: SPO occurs at 4.8 kV, POI is on the 4.8 kV bus; and
Case 2: SPO occurs at 4.8 kV, POI is on the 34.5 kV bus (d:YG transformer between the SPO and the POI).

Figure 20:
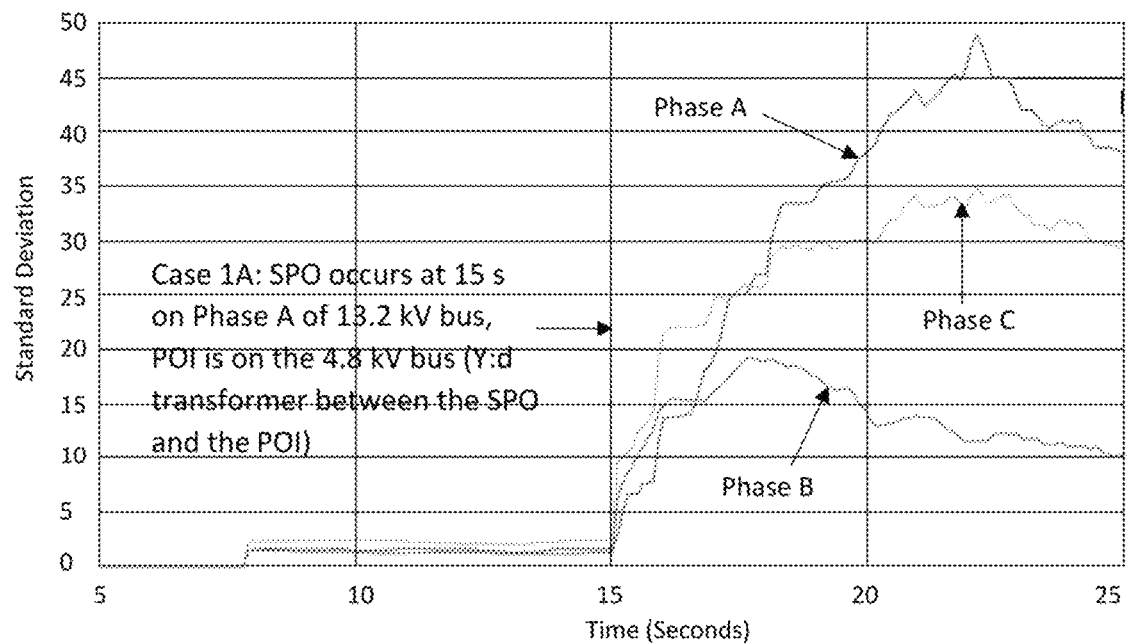
FIG. 20 depicts the windowed-average standard deviation of the RMS phase-to-ground voltages in the example of FIG. 19, with a SPO on Phase A of the 13.2 kV bus.
Figure 21:
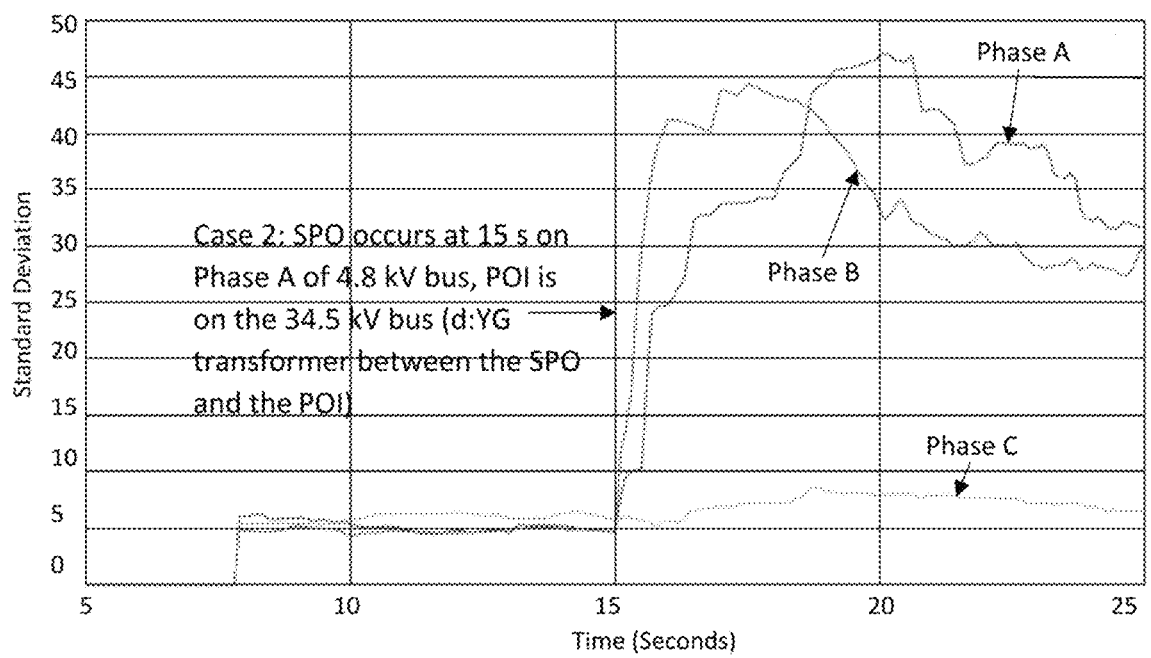
FIG. 21 depicts the windowed-average standard deviation of the RMS phase-to-ground voltages in the example of FIG. 19, with a SPO on Phase A of the 34.5 kV bus While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

In all three of these cases, a grounding transformer was present on the high side of the IBDER plant GSU transformer. In general, the impact of the inline transformers is that when the SPO occurs, the resulting change in POI voltage standard deviation is "smeared" across more than one phase. The case in which the PPVSD was the most challenged was Case 1 A, and the resulting voltage standard deviations are shown in FIG. 20. The standard deviation of the POI voltage increases on all three phases when the SPO forms, but the difference between the highest and lowest standard deviations remains large enough for long enough that the PPVSD still detects this case. FIG. 21 shows the per-phase POI voltage standard deviations for Case 2 (the results for Case 1B were similar). In Case 2, the SPO is in an ungrounded circuit section, and the POI is in a grounded section with an inline transformer that functions as a grounding bank. The POI voltage standard deviation jumps on two of the phases when the SPO is formed, but the third phase's standard deviation remains low. Because the PPVSD algorithm uses the highest and lowest standard deviations, this case is easier to detect than Case 1 A.

6. Transmission-Level Events

It is desired that the PPVSD ride through disturbances caused by asymmetrical faults at the transmission level. Typically, such disturbances have very short time durations, such that the delay built into the PPVSD should assure the desired ride-through.

All protection methods strive to achieve an acceptable combination of sensitivity, selectivity, and speed. The proposed method relies on a relatively lengthy time delay for achievement of selectivity, and thus sacrifices speed for selectivity. The results obtained to date suggest that this tradeoff leads to acceptable selectivity and sensitivity.

7. Summary

The results from the testing can be summarized as follows:

In general, the PPVSD method is very effective in terms of sensitivity. In all cases tested the PPVSD method successfully detected the SPO.

When voltage-reconstruction mechanisms such as a grounding transformer or three-phase induction machine load were added, the PPVSD method retained its effectiveness.

The PPVSD method worked with all three inverters, but the difference between the standard deviation on the open phase versus the still-closed phases depended strongly on which inverter was modeled. Inverter #1 consistently showed the smallest values of D from Equation (9), while Inverter #3 showed much larger values. This is attributed to the fact that Inverter #3 is the switched model, and thus its output current contains realistic levels of harmonics. From this it can be concluded that the PPVSD method could work faster with some inverters than with others, and also that the standard deviation results with Inverters #1 and #2 are probably artificially low because those models do not include switching harmonics.

Assessment of the impact of circuit strength on the effectiveness of the PPVSD method is challenging because many variables change when moving from one circuit to another and it is not possible to isolate the impact of circuit strength or impedance. In general, it is expected that SPO detection via the PPVSD method should be more challenging on weaker (higher-impedance) circuits because $Z_{L1}$ in Equation (4) is larger in that case. The data from the testing described are generally consistent with that expectation.

The switching of a large SPIM causes a change in voltage standard deviation whose magnitude is comparable to that caused by an SPO, but its duration is limited. Thus, a suitable time delay enables careful discrimination between the two cases.

The PPVSD method has good selectivity between SPO cases and large motor-start cases, largely due to the 15-second time delay selected.

Hence, the PPVSD method enables grid-following IBDERs to detect an arbitrarily-located SPO on a three phase circuit. The method uses readily available parameters and the required logic can be programmed into existing off-the-shelf relays and controllers at the POI. Simulations were run to test the sensitivity and selectivity of the method and to help in setting the parameters. The PPVSD method successfully detected all the SPO situations under which it has been tested (good sensitivity), and successfully rode through all of the ride-through conditions tested (good selectivity).

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A method of detecting and mitigating an arbitrarily-located single-phase open circuit in a three-phase AC power distribution grid hosting an inverter-based distributed energy resource (IBDER), the method comprising:
   a) measuring an RMS voltage for each one of the three phases over a first sample interval comprising a predetermined time period;
   b) calculating a standard deviation value of the RMS voltage for each one of the three phases for the first sample interval;
   c) determining a minimum phase voltage standard deviation and a maximum phase voltage standard deviation from among the three calculated standard deviation values for the first sample interval;
   d) subtracting the minimum phase voltage standard deviation from the maximum phase voltage standard deviation to produce a difference value for the first sample interval;
   e) storing the difference value in a buffer;
   f) iteratively repeating steps a)-e) for successive additional sample intervals until the buffer contains a predetermined number N of difference values covering at least 15 seconds;
   g) comparing each of the N difference values in the buffer with a predetermined threshold difference value; and
   h) automatically disconnecting the IBDER from the three-phase power distribution grid if all N difference values exceed the threshold difference value.

2. The method of claim 1, further comprising deleting an oldest difference value from the buffer if the IBDER was not disconnected in step h), performing steps a)-e) for an additional successive sample interval, and performing steps g) and h) with the buffer including the difference value for the additional successive sample interval.

3. The method of claim 1, wherein the predetermined time period is one second.

4. The method of claim 1, wherein the number N of difference values in the buffer is at least 15.

5. The method of claim 1, wherein the predetermined threshold value is 20 volts.

6. The method of claim 1, wherein the IBDER is a photoelectric array.

7. A system for detecting and mitigating an arbitrarily-located single-phase open circuit in a three-phase AC power distribution grid hosting an inverter-based distributed energy resource (IBDER), the system comprising:
   at least three voltage sensors, each one of the at least three voltage sensors electrically coupled to measure a phase voltage of a separate one of the phases of the three-phase power distribution grid, each one of the at least three voltage sensors generating an output signal proportional to the phase voltage of the phase to which it is coupled;
   a processor communicatively coupled to receive the output signals of the at least three voltage sensors, and including a buffer, the processor programmed with an algorithm to:
   a) calculate a standard deviation value of the phase voltage for each one of the three phases based on the received voltage sensor output signals over a first sample interval;
   b) determine a minimum phase voltage standard deviation and a maximum phase voltage standard deviation from among the three calculated standard deviation values for the first sample interval;
   c) subtract the minimum phase voltage standard deviation from the maximum phase voltage standard deviation to produce a difference value for the first sample interval;
   d) store the difference value in the buffer;
   e) iteratively repeat steps a)-d) for successive additional sample intervals until the buffer contains a predetermined number N of difference values covering at least 15 seconds;
   f) compare each of the N difference values in the buffer with a predetermined threshold difference value; and
   g) generate a disconnection signal to disconnect the IBDER from the three-phase power distribution grid if all N difference values exceed the threshold difference value.

8. The system of claim 7, further comprising an automated switch disposed between the IBDER and the three-phase AC power distribution grid, the switch communicatively coupled to the processor and adapted to receive the disconnection signal to interrupt the flow of power from the IBDER to the grid.

9. The system of claim 8, wherein the automated switch is a normally open relay.

10. The system of claim 7, wherein the processor is communicatively coupled to the IBDER, and the IBDER is adapted to receive the disconnection signal to interrupt the flow of power from the IBDER to the grid.

11. The system of claim 7, wherein the algorithm further comprises deleting an oldest difference value from the buffer if a disconnection signal was not generated in step g), performing steps a)-d) for an additional successive sample interval, and performing steps f) and g) with the buffer including the difference value for the additional successive sample interval.

12. The system of claim 7, wherein the predetermined time period is one second.

13. The system of claim 7, wherein the number N of difference values in the buffer is at least 15.

14. The system of claim 7, wherein the predetermined threshold value is 20 volts.

15. The system of claim 7, wherein the IBDER is a photoelectric array.

* * * * *